United States Patent [19]

Valles-Navarro

[11] Patent Number: 5,908,181
[45] Date of Patent: Jun. 1, 1999

[54] SUPPORT FOR CAMERAS

[76] Inventor: Alfredo Valles-Navarro, Moderna, 53-08902 Hospitalet De Llobregat, Barcelona, Spain

[21] Appl. No.: 08/911,067

[22] Filed: Aug. 14, 1997

Related U.S. Application Data

[63] Continuation-in-part of application No. 08/582,908, Jan. 4, 1996.

[30] Foreign Application Priority Data

Jan. 4, 1995 [ES] Spain ..................................... 9500057

[51] Int. Cl.$^6$ ................................................. F16M 11/02
[52] U.S. Cl. ...................... 248/177.1; 396/428; 396/419; 396/5
[58] Field of Search ............................... 248/177.1, 415, 248/178.1, 179.1, 186.2, 187.1, 163.2, 286.1, 278.1, 279.1, 282.1, 284.1; 396/428, 419, 5

[56] References Cited

U.S. PATENT DOCUMENTS

| | | | |
|---|---|---|---|
| 1,963,463 | 6/1934 | Hammer | 248/37 |
| 3,586,278 | 6/1971 | Simons | 248/165 |
| 4,044,364 | 8/1977 | Prinzo | 354/74 |
| 4,615,597 | 10/1986 | Burriss | 354/293 |
| 4,752,791 | 6/1988 | Allred | 354/81 |
| 4,779,833 | 10/1988 | Fletcher et al. | 248/550 |
| 4,976,582 | 12/1990 | Clavel | 414/729 |
| 5,400,993 | 3/1995 | Hamilton | 248/278 |

FOREIGN PATENT DOCUMENTS 2188231  9/1987  United Kingdom .

*Primary Examiner*—Ramon O. Ramirez
*Assistant Examiner*—Kimberly Wood
*Attorney, Agent, or Firm*—Dennison, Meserole, Scheiner & Schultz

[57] ABSTRACT

An assembly for holding a camera comprising a first section including two flat portions, a sleeve portion from which the flat portions extend so as to enable movement of the sleeve portion, a first and a second pair of tubes extending perpendicularly from an end of each flat portion, a platform slidable supported by the first pair of tubes, a double clamp slidable supported by the second pair of tubes, a second section including a substantially flat upright, a first pair of tubes extending perpendicularly from a lower end of the upright, a double clamp separating the ends of the first pair of tubes, a second pair of tubes extending perpendicularly from the double clamp, the first section being connected with the second section so as to enable relative rotation between the sections.

3 Claims, 4 Drawing Sheets

SUPPORT FOR CAMERAS

This application is a continuation-in-part of Ser. No. 08/582,908, filed Jan. 4, 1996.

BACKGROUND OF THE INVENTION

The invention concerns an improved support assembly which sustains the rolling, rotating, ascending and descending control of cameras.

There are assemblies on the market to sustain rolling, rotating, ascending and descending remotely controllable supports for cameras, such as the one described in U.S. Pat. No. 4,779,833.

These camera-supporting assemblies are usually in the form of an L or an inverted U-shaped arrangement for cameras of large volume and weight.

These types of assembly are joined to the mounting head, which is in oscillating and rolling form in order to allow the camera to change its lens position as necessary to take the desired views of an object.

The mounting heads holding the pivoting platform that supports the larger, heavier cameras require a support of great size and strength. However, since these mounting heads are constructed with non-extendable, permanent structures, whether of the L-shape or the U-shape, they need to be replaced by similar but larger ones in order to house larger and heavier cameras.

This constitutes a great expense and the mounting heads need much time and effort to be replaced. On the other hand, the mounting heads of the prior art, though they are indeed larger and stronger than those previously available and serve as a substitute for them, have the disadvantage that they are also constructed in standard dimensions which are not always in keeping with those of the larger and heavier cameras to be supported.

This gives rise to a series of problems for the user of these mounting heads.

On the other hand, the position, angle of movement and rotation about itself of the articulated platform of the mounting head holding the camera to be placed thereon are regulated in accord with the camera it holds in an articulated manner, in an equilibrated form to avoid sudden movements causing blurred views of the object captured by the lens of the camera.

One must also bear in mind that cameras attached in a pivoting manner to the articulated platforms of the mounting head are in equilibrium, and logically this equilibrium need not be present when the articulated support is replaced by a larger one, whether it be of the L-shape or the U-shape.

This does not occur with the new mounting head since the platform is already of medium size, serving equally for small, average or large cameras; moreover, the existing mounting head, whether L or inverted U-shaped, is advantageous in that all the points of articulated attachment as well as those of counterweight and disconnection of electric supply are held in the same position, and there is no need to change the mounting head, but rather an expansion of the one already installed.

The counterweight position must be as close as possible to that of the camera already installed and that the position must be altered in order to maintain the camera's maximum ability to effect the movements known as "panning" (panoramic) and "tilting" (vertical or swiveling), which correspond to the inclining or tilting motions of the camera located on the oscillating platform of the mounting head.

It is very important, in order to avoid picture distortions which impede normal observation of the image being captured, that the axis of rotation should be nearest the nodal point or the axis of the camera lenses so as to avoid the pictures captured by the camera from being thrown out of focus.

Good camera equilibrium on the articulated platform is most important in order to avoid sudden brusque motions from alternating with smooth ones in the movements of the camera support due to a non-equilibrium, in order to enable the smooth movements of pan and tilt and the simultaneous movement of the juncture of the two and passing as closely as possible by the nodal point of the optical axis of the camera in order that it can rotate about itself through 360° when the optical axis passes through the nodal point of the camera.

It should be noted that when the mounting head's axis of rotation passes through an axis which is not across both points of orientation and position of the camera, then the scenes on which the camera is focusing appear disproportionate and blurred.

Those assemblies holding the articulated platforms whose center contains the camera's pivoting unit, the platforms on these assemblies have a large central orifice in which the lens of the camera is inserted. Therefore, in these cases the camera is located next to and is connected to one of the two surfaces of the platform and the edge of the orifice and on the opposite facade to the surface of its own platform.

It is clear that the equilibrium of the camera in these cases is not centered in a position of support at the center of the platform's surface, but in its central portion it lacks the formative material of the base, since in its place it has a large orifice.

As a result, this attachment is carried out with the weight of the camera suspended in air.

When a dead weight is suspended in air, it is necessary to bring additional force to bear to compensate for the non-equilibrium of the weight thrown off center. In this case it is the existence of a large central orifice in the center of the articulated platform which prevents the placement of the camera, with all its weight, over the center of the platform.

It is clear that with the existence of a large central orifice the placement mentioned above cannot be effected, nor can the base of the articulated platform be supported in that central portion.

This additional effort impedes the equilibrium of the central running lead of the platform in which the camera is connected in a pivoting way, since with the change in the platform's position with respect to the mounting head due to this movement from center, sudden accelerations arise in changes of position which change the smooth and continuous motion of the picture in the lens of the camera and cause the lack of constant clarity in the picture seen through the camera lens.

OBJECT OF THE INVENTION

The camera mounting-head assemblies constructed are improved according to the invention by replacement of each of the solid arms by two lightweight tubes, for example of aluminum, fastened at a distance from each other by two transversal, rigid, bands with their ends diverging in the form of a jaw, each jaw of which is in the form of a half circle, these half circles closing against each other constituting a ring around the tube.

The jaws are pressed together by fasteners.

In this way the spatial assembly achieved is lighter than the assemblies being manufactured and sold on the market.

This simple construction is achieved by virtue of the fact that sections are connectable with other and additional ones, to construct an assembly in accordance with the needs for each type of camera to be held.

SUMMARY OF THE INVENTION

The invention consists of the fact that the assembly is composed of lightweight spatial sections defined by two parallel tubes separated from each other and fastened by means of rigid transverse flanges, so that their ends are in opposing jaws connected by pressure screws such as bracket screws.

Each pair of parallel tubes can be extended by joining in an adequate form such as with coupling sleeves. Parallel tubes are inserted into the components provided on the edges of articulated modules forming part of the mounting head and a pivoting platform.

Each section of the tubes connected by transverse flanges with fixing and holding jaws is additionally united to another section; coupling sleeves are arranged in which the tubes are united under pressure of fasteners.

DETAILED DESCRIPTION OF THE INVENTION

An embodiment of the invention will be described in conjunction with FIG. 1.

Figure 1:
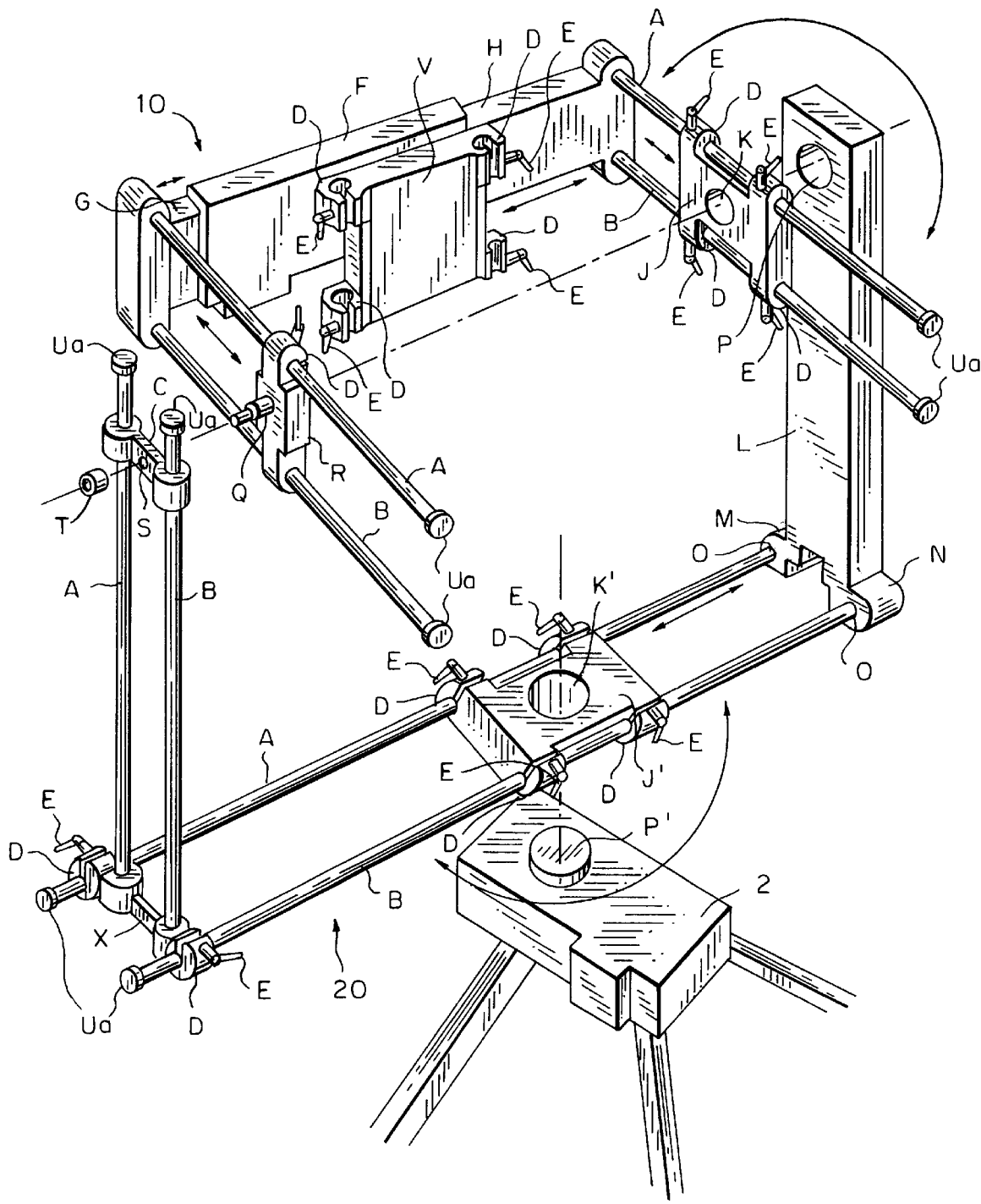
FIG. 1 is a perspective view of the camera support according to the invention.

As shown in the perspective view FIG. 1, the camera support is formed by two substantially U-shaped sections, an upper section (10) and a lower section (20), both being swivel mounted and juxtaposed.

For each section, the parallel legs of the U are formed by pairs of lightweight tubes (A, B) extending from a solid arm having a rectangular cross-section.

A first or upper section arm is formed from two flat portions (G, H) which are held together by a coupling sleeve (F) so as to enable length adjustment. A pair of tubes extend from the outer ends of the flat sections. On the pair of tubes shown on the right side of FIG. 1, a platform (J) is arranged so as to be slidable along the tubes. Bolts are employed for fixing the platform at a desired position. The platform includes a control bore (K) for enabling rotation around a pin (P). On the pair of tubes shown on the left side of FIG. 1, a double clamp (R) stabilizes the tubes. A swivel axis (Q) with a tapped end extends from the clamp.

A cradle support (V) is fixed to the coupling sleeve (F). This support includes four securing jaws (D), each of which includes a tightening bolt (E) for holding a cradle in a desired position.

The second or lower section comprises a substantially flat upright (L) having a pin (P) extending near an upper end, a pair of feet (M, N) with apertures (O). A pair of tubes (A, B) extend from the aperture at right angles to the upright. The tubes support a slidable platform (J') and are separated near the tube end stops ($U_a$) by a double clamp (X). The double clamp holds a pair of tubes extending vertically and near the tube ends ($U_a$) a securing flange (C) separates the tubes. The securing flange includes a central aperture (S). The platform (J', K', P') includes an aperture (K') and bolts (E) for securing the platform at a desired position. The central aperture enables rotation around a pin (P') extending from a conventional tripod.

The first and second sections are connected by the pin (P) extending from the upright through the aperture (K) in the platform (J). Further, the double clamp (R) can be positioned so that the axis (Q) extends through the securing flange aperture (S). A nut (T) is employed for tightening and thus stabilizing the camera support.

Figure 2:
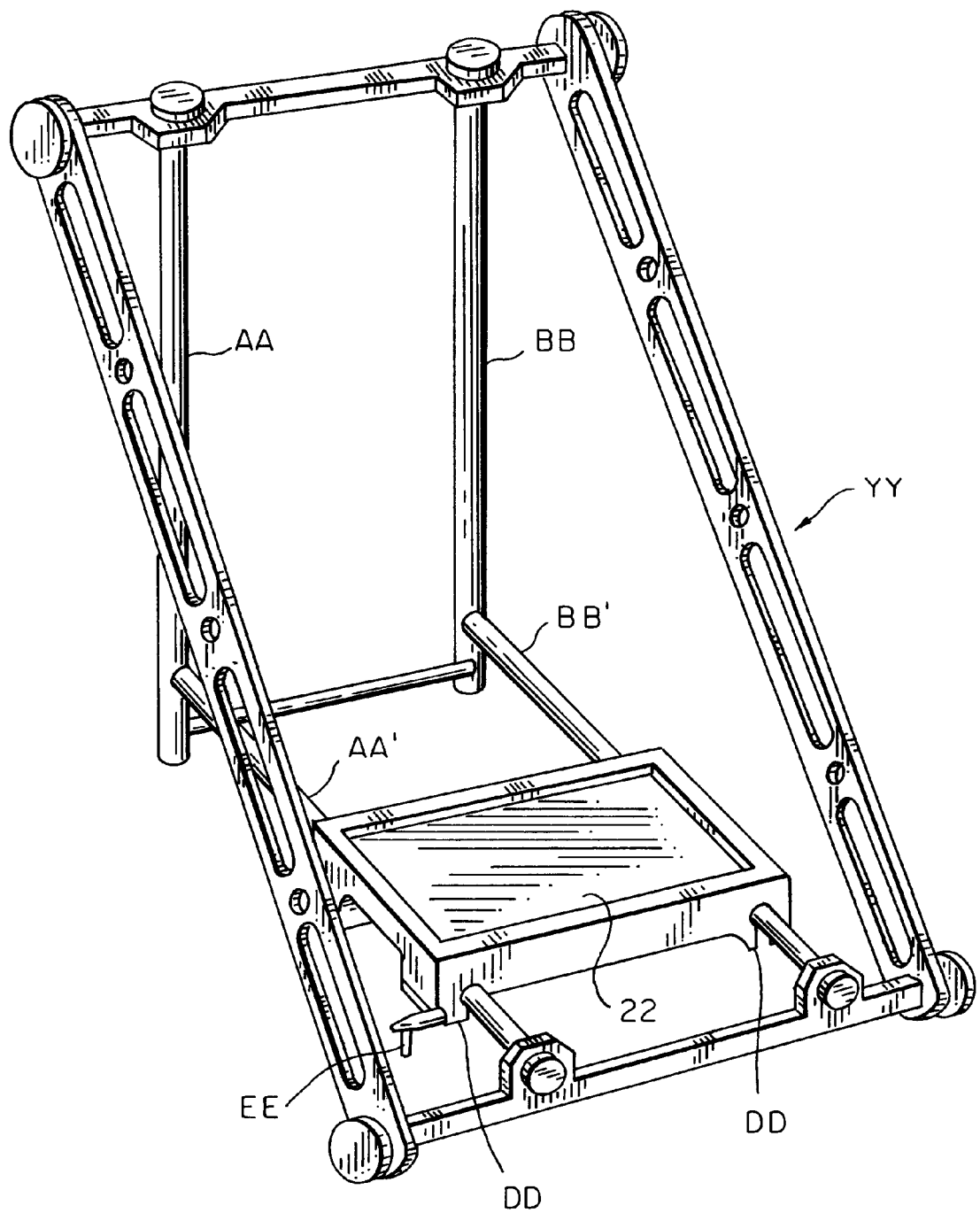
FIG. 2 is a perspective view of a prior art cradle for use with the camera support of the invention.

A conventional cradle (YY) shown in FIG. 2 includes tubes (AA, BB) which can be inserted into the securing jaws (D in FIG. 1) and fixed into the desired positions. The cradle includes a platform (ZZ) for supporting a still or movie camera.

As shown in FIG. 1, the pin (P) and the axis (Q) connection permit rotation of the upper section and thus "Pan" or "Tilt" movement of the camera attached to the cradle.

To enable remotely controlled movements, small electric motors can be located in the upright (L) and in the coupling sleeve (F).

Figure 4:
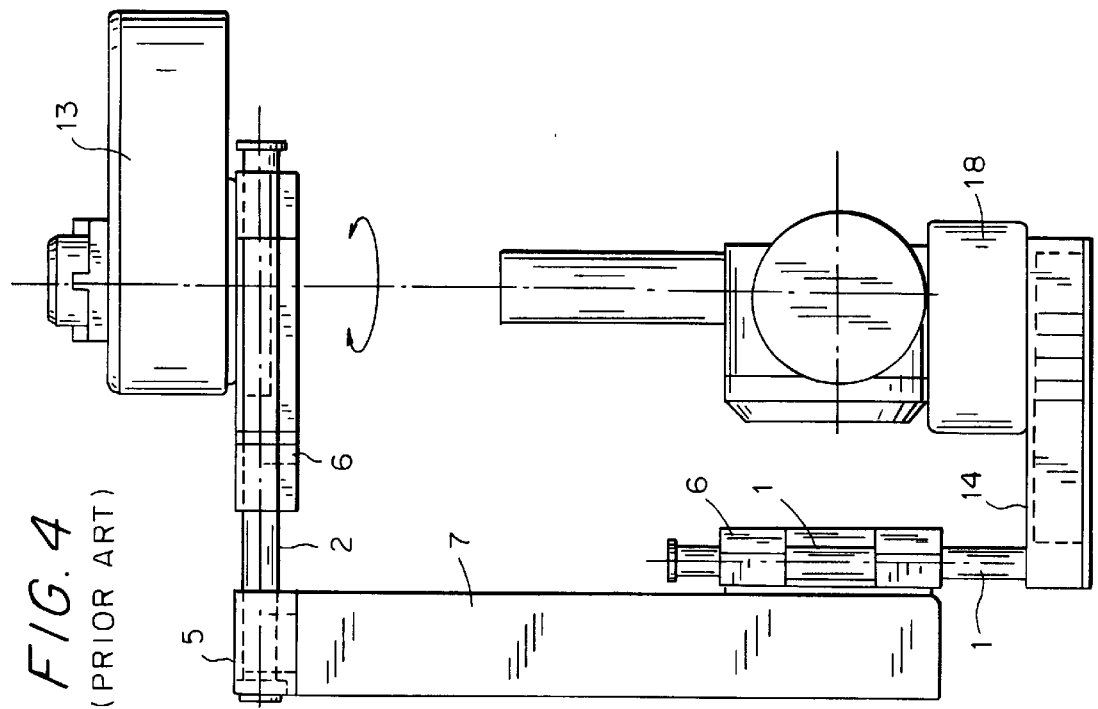
FIGS. 3–6 are side views of conventional camera supports.
Figure 3:
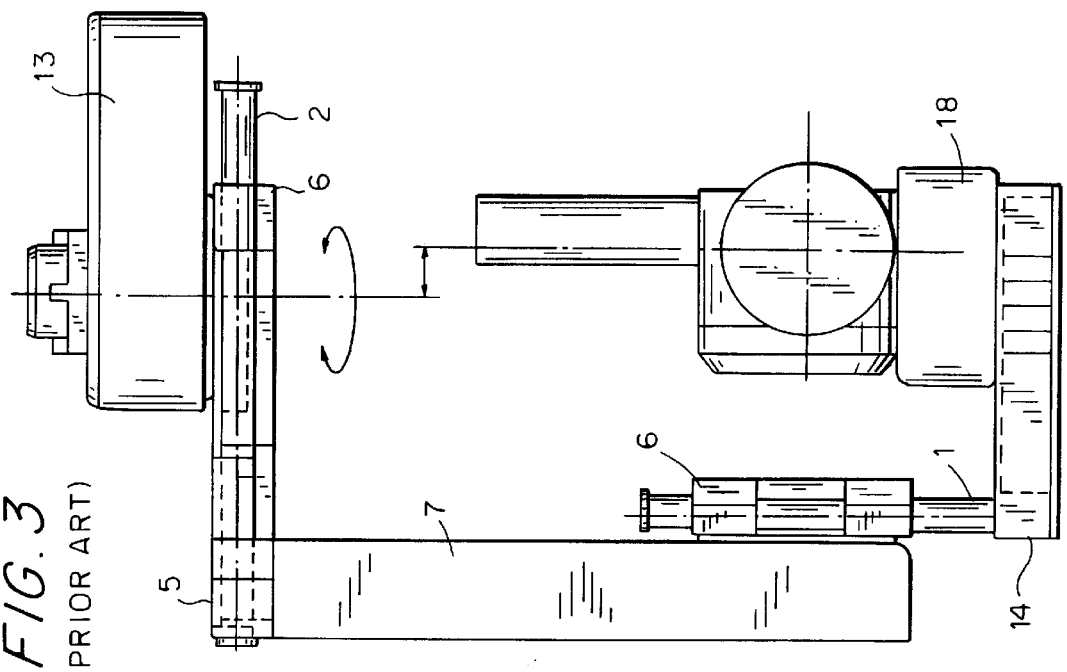

In FIGS. 3 and 4, the conventional camera support is shown in an inverted U position, with the module fastened to an upper arm which is separated by a lateral slide from the vertical arm.

Figure 6:
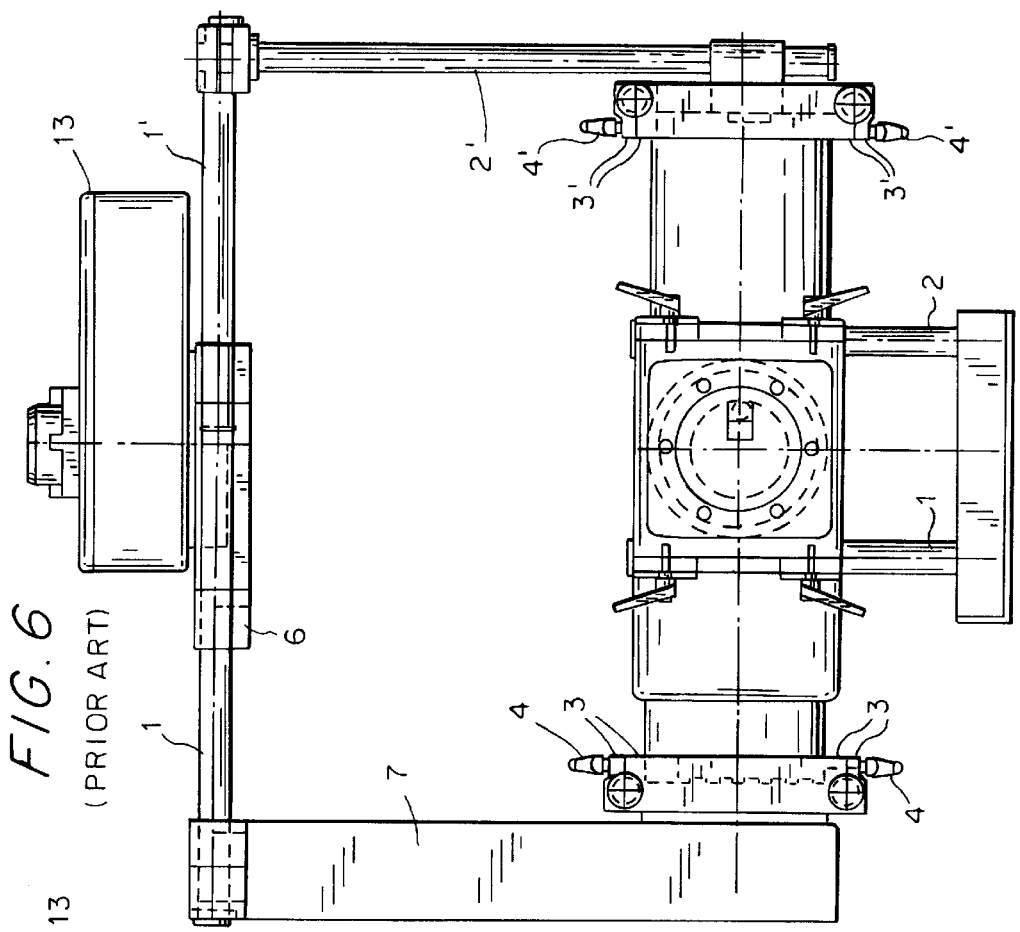
Figure 5:
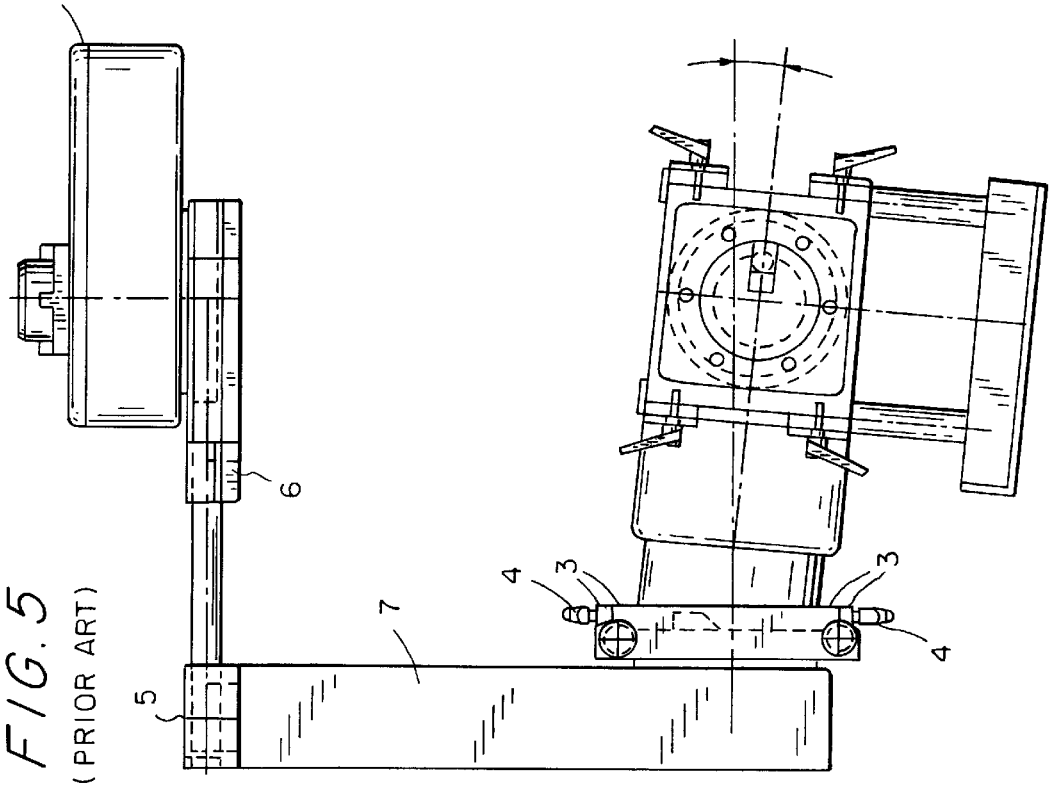

In FIGS. 5 and 6 the support in the shape of a U with the addition of one L-section which completes the U, thus converting it into an inverted U.

It is assumed that although several details of design and construction may vary, that does not alter, change or modify what is essential to the invention.

what is claimed is:

1. An assembly for holding a camera comprising:
   a first section including two flat portions, a sleeve portion from which the flat portions extend so as to enable movement of the sleeve portion;
   a first and a second pair of tubes extending perpendicularly from an end of each flat portion;
   a first platform slidably supported by the first pair of tubes;
   a first double clamp slidably supported by the second pair of tubes;
   a second section including a substantially flat upright, a third pair of tubes extending perpendicularly from a lower end of the upright, a second double clamp separating the ends of the third pair of tubes;
   a fourth pair of tubes extending perpendicularly from the second double clamp;
   and means for connection of the first section with the second section so as to enable relative rotation between the sections.

2. The assembly of claim 1, wherein said means for connection includes a pin extending from the flat upright cooperating with an aperture in said platform and the first double clamp having a swivel axle cooperating with an aperture in a securing flange slidably supported by the fourth pair of tubes of said second section.

3. The assembly of claim 2, further including a second platform slidable on said third pair of the tubes, said second platform having an aperture for mounting on a tripod pin so as to enable rotation relative to the tripod and a camera cradle support fixed to the sleeve portion so that a camera supported by the camera cradle can be moved relative to the tripod and tilted relative to the second section.

\* \* \* \* \*